Figure 1:
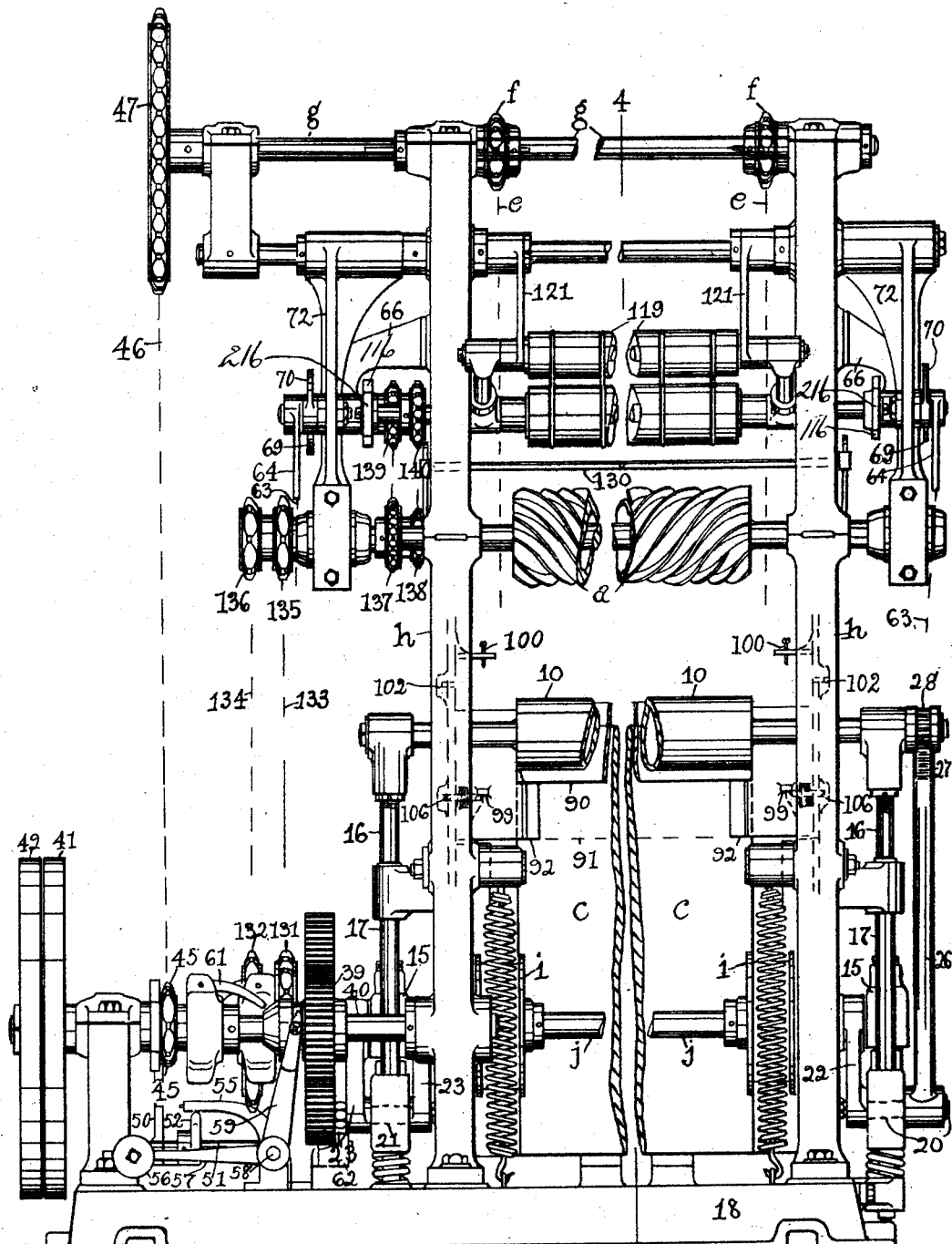

F. J. PERKINS.
PUTTING-OUT MACHINE.
APPLICATION FILED SEPT. 30, 1908.

926,825.

Patented July 6, 1909.
11 SHEETS—SHEET 1.

Witnesses.
C. H. Gannett.
J. Murphy.

Inventor.
Franklin Jay Perkins
By Jas. H. Churchill
atty.

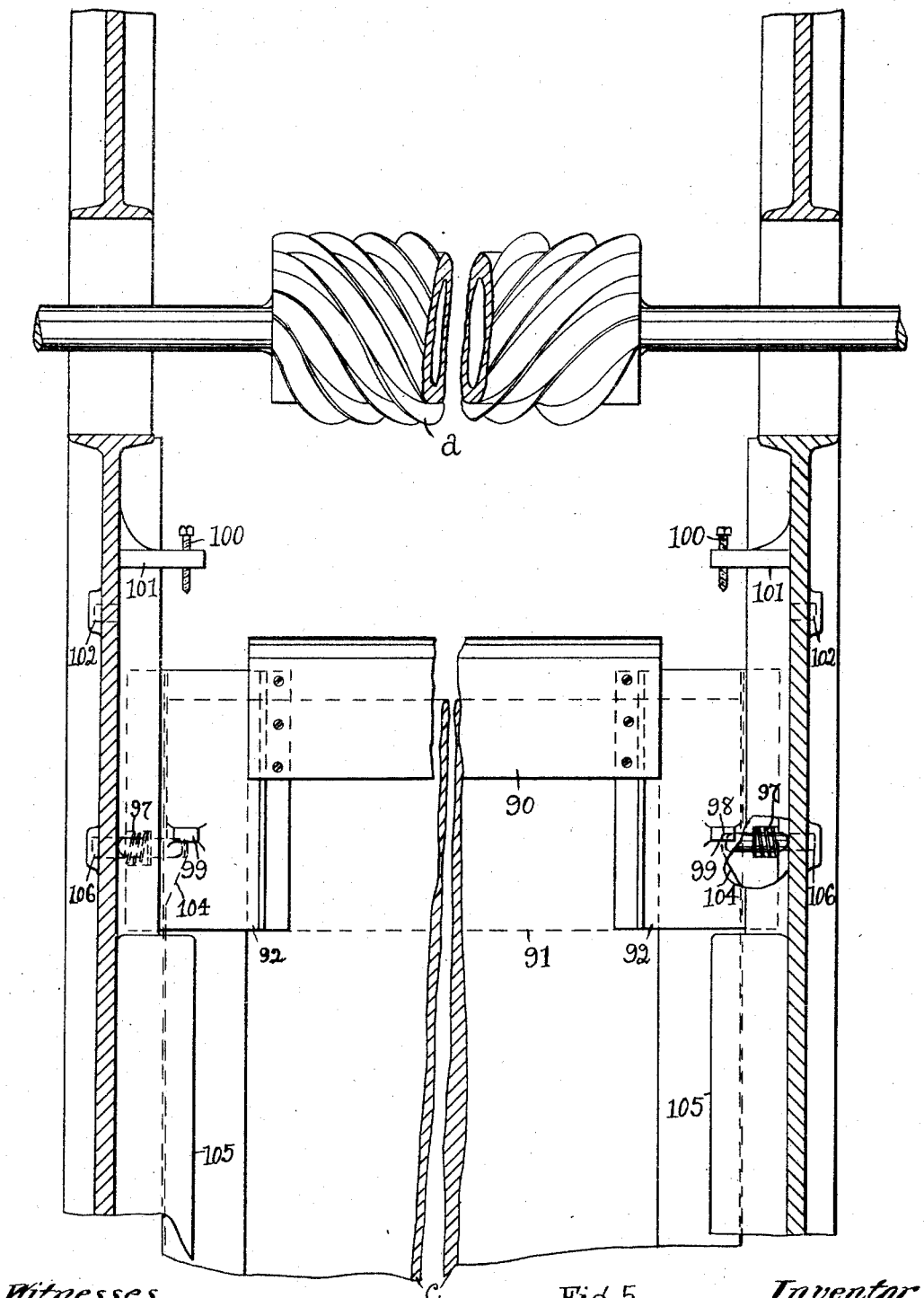

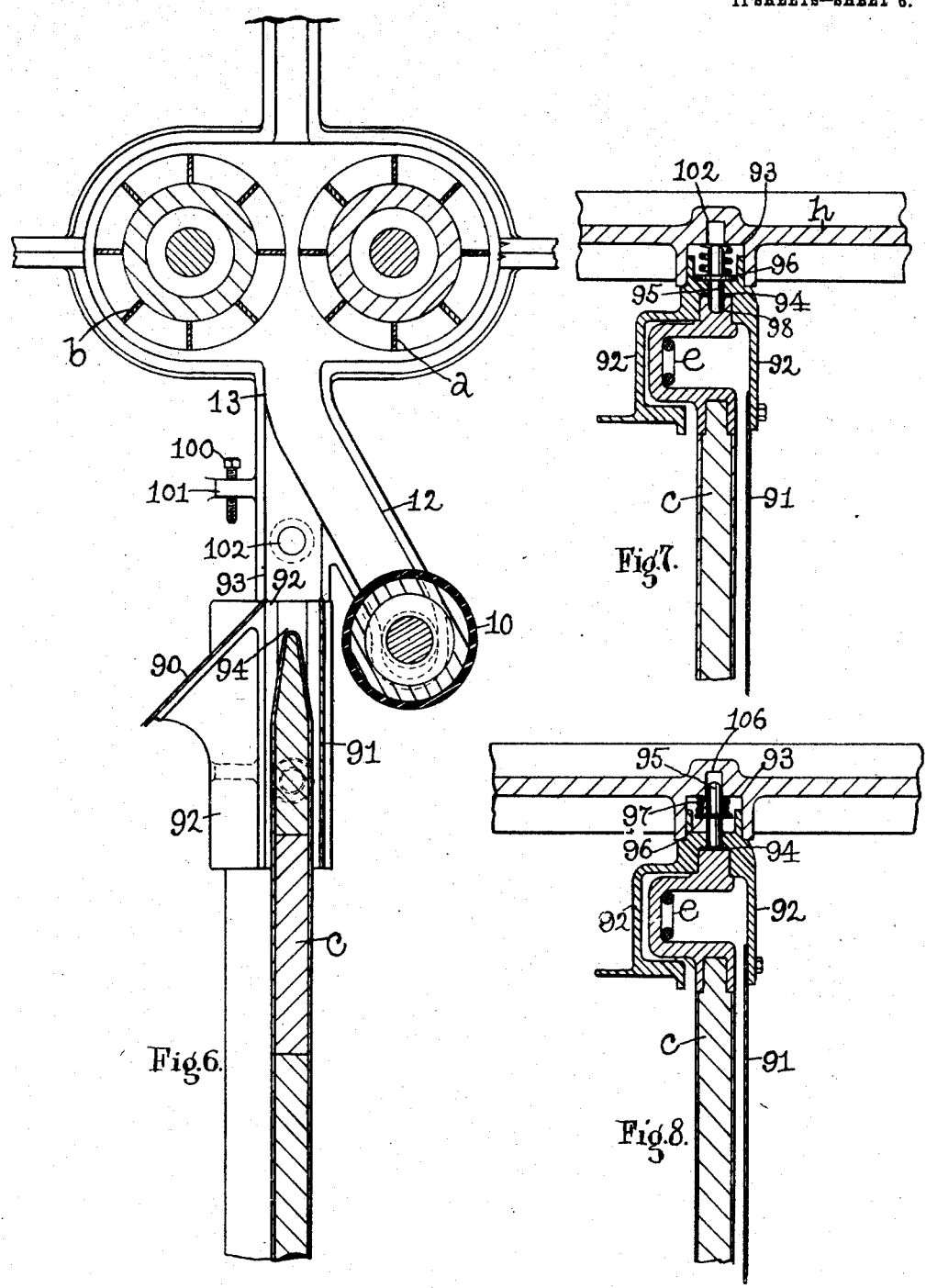

F. J. PERKINS.
PUTTING-OUT MACHINE.
APPLICATION FILED SEPT. 30, 1908.

926,825.

Patented July 6, 1909.
11 SHEETS—SHEET 7.

Witnesses.
C. H. Gaunett
J. Murphy

Inventor:
Franklin Jay Perkins
Jas. H. Churchill
atty.

F. J. PERKINS.
PUTTING-OUT MACHINE.
APPLICATION FILED SEPT. 30, 1908.

926,825.

Patented July 6, 1909.
11 SHEETS—SHEET 9.

Witnesses.
C. H. Gannett
J. Murphy

Inventor
Franklin Jay Perkins
by Jas. H. Churchill
atty.

F. J. PERKINS.
PUTTING-OUT MACHINE.
APPLICATION FILED SEPT. 30, 1908.

926,825.

Patented July 6, 1909.
11 SHEETS—SHEET 10.

F. J. PERKINS.
PUTTING-OUT MACHINE.
APPLICATION FILED SEPT. 30, 1908.

926,825.

Patented July 6, 1909.
11 SHEETS—SHEET 11.

Witnesses.
Inventor

UNITED STATES PATENT OFFICE.

FRANKLIN JAY PERKINS, OF WOBURN, MASSACHUSETTS, ASSIGNOR TO THE TURNER COMPANY, G. M. B. H., (LIMITED,) OF FRANKFORT-ON-THE-MAIN, GERMANY, A CORPORATION OF GERMANY.

PUTTING-OUT MACHINE.

No. 926,825.  Specification of Letters Patent.  Patented July 6, 1909.

Application filed September 30, 1908. Serial No. 455,531.

*To all whom it may concern:*

Be it known that I, FRANKLIN JAY PERKINS, a citizen of the United States, residing in Woburn, county of Middlesex, and State of Massachusetts, have invented an Improvement in Putting-Out Machines, of which the following description, in connection with the accompanying drawings, is a specification, like characters on the drawings representing like parts.

This invention relates to a machine for treating hides, skins and leather, and is herein shown as embodied in a machine for putting-out hides and skins in which a reciprocating table or work-support is employed and which is commonly known as a single table machine.

The present invention has for its object to provide a single table putting-out machine, with which the entire surface of the hide or skin can be treated in a superior manner, and at a minimum cost in time and labor, as will be described. To this end, the machine having the usual working tools or bladed cylinders or rolls located on opposite sides of the path of movement of a vertically reciprocating table or work-support, is provided with a rotatable support for the hide or skin, preferably a rubber covered roll, which is bodily movable toward and from the working cylinders and into and out of the path of movement of the table, and provision is made for turning or oscillating said support when in proximity to the working cylinders, so as to cause the back bone portion of the hide or skin to be effectively put out or otherwise treated before the sides of the same are worked out, as will be described. Provision is made for enabling the hide or skin to be effectively worked out with a single operator running the machine, as will be described. Provision is also made for automatically removing the treated hide or skin. These and other features of this invention will be pointed out in the claims at the end of this specification.

Figure 2:
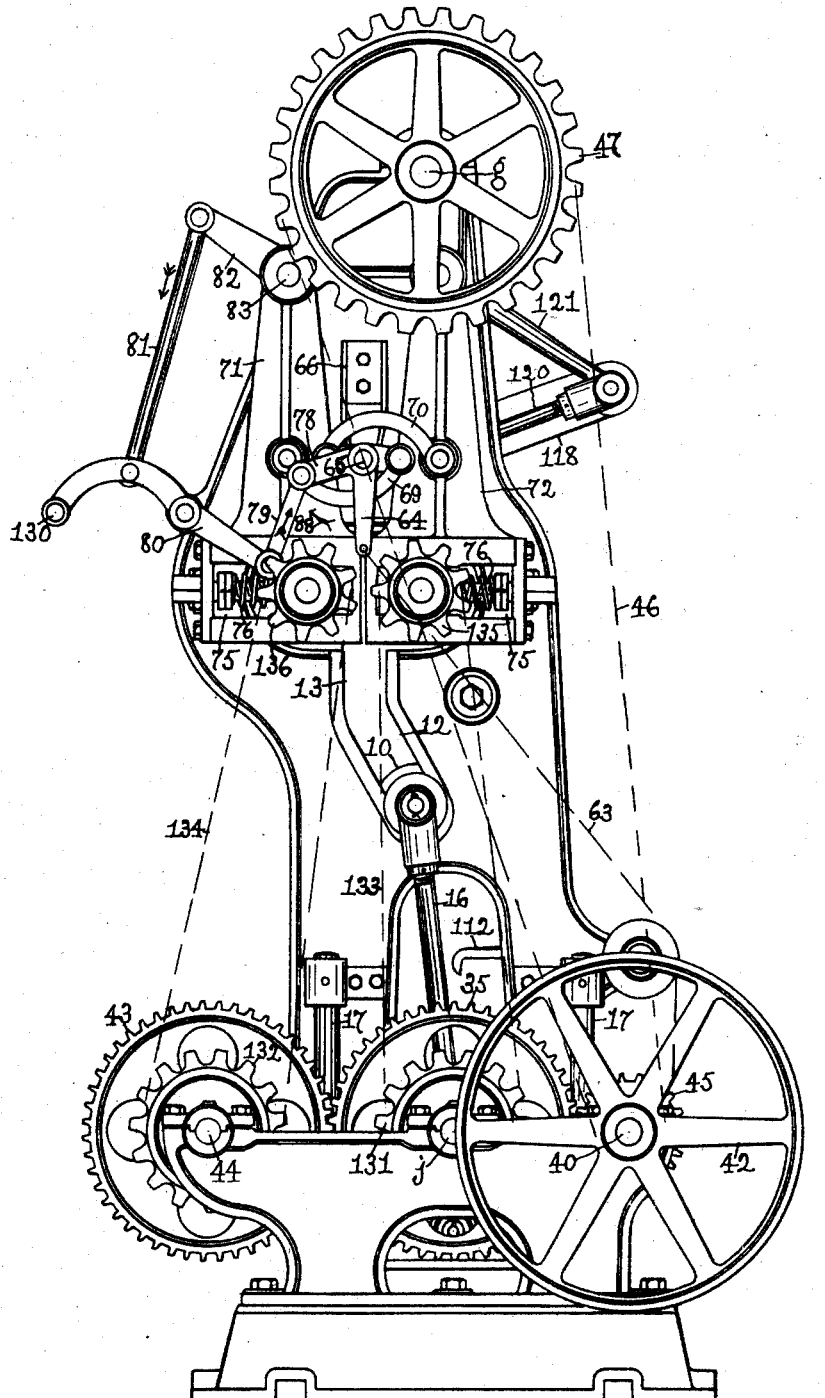
Figure 3:
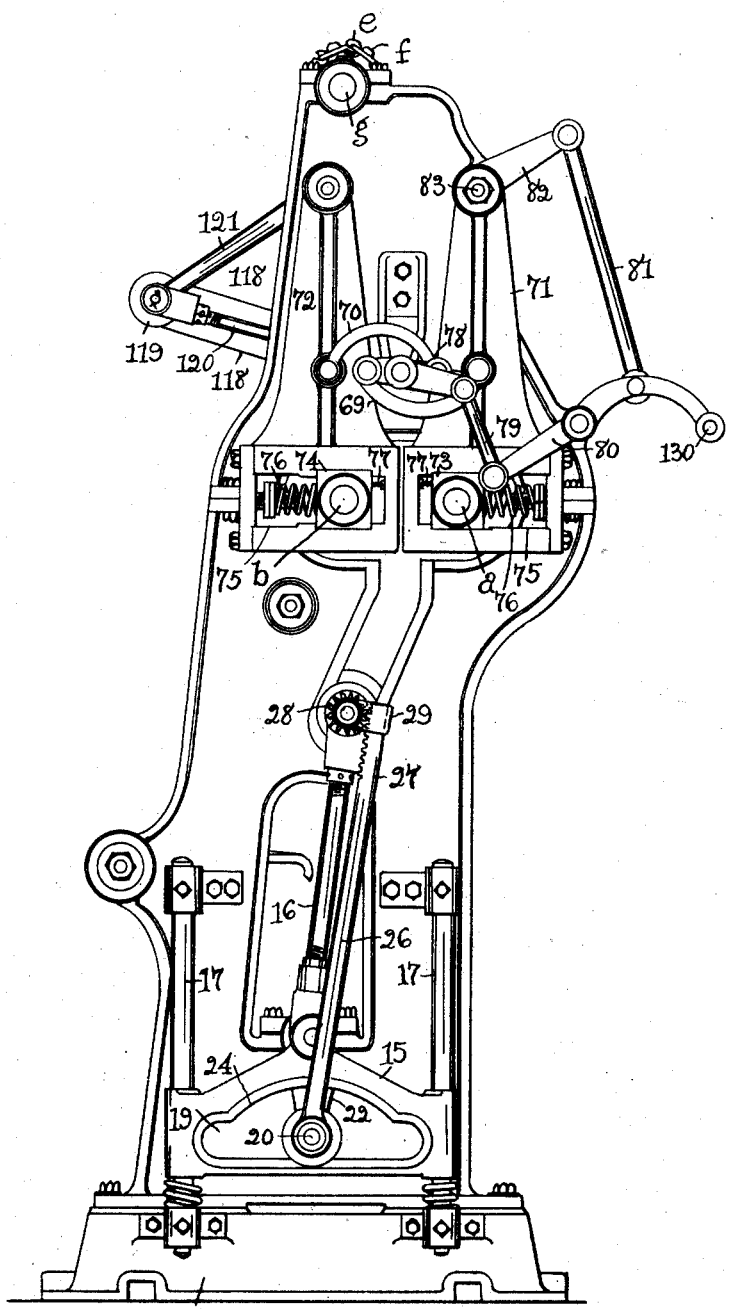
Figure 4:
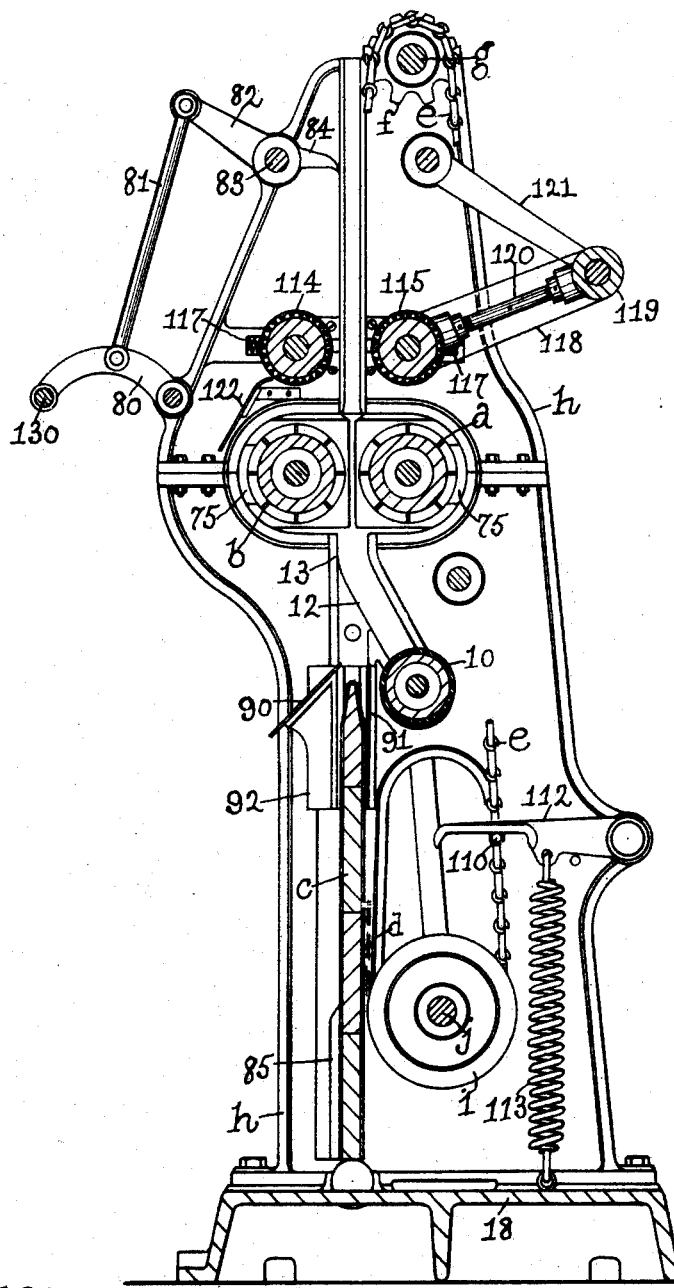
Figure 9:
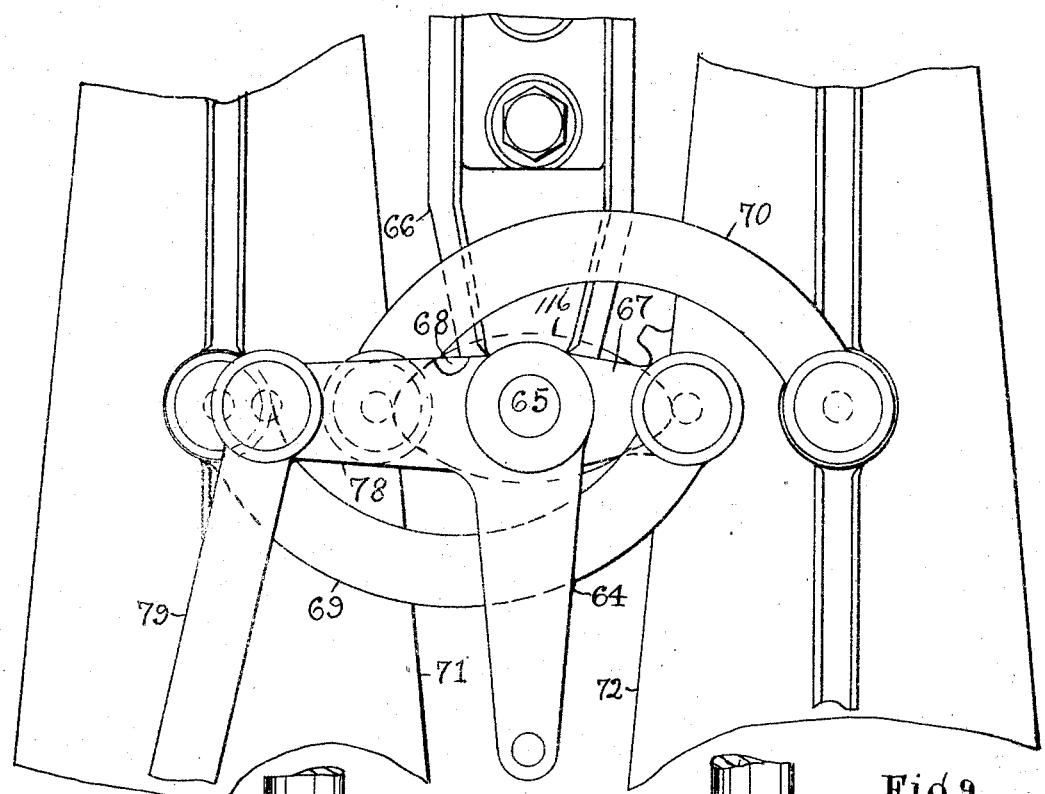
Figure 10:
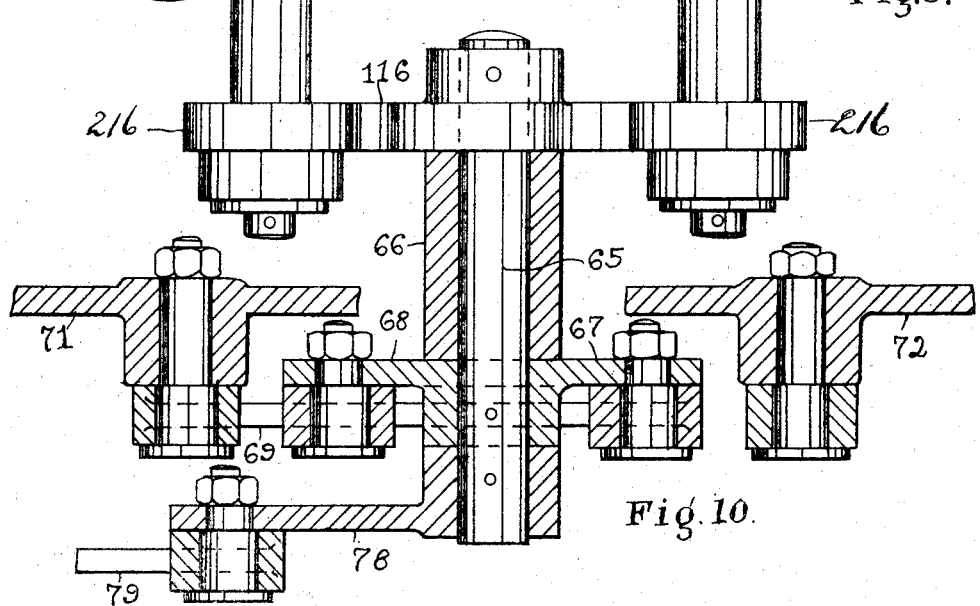
Figure 11:
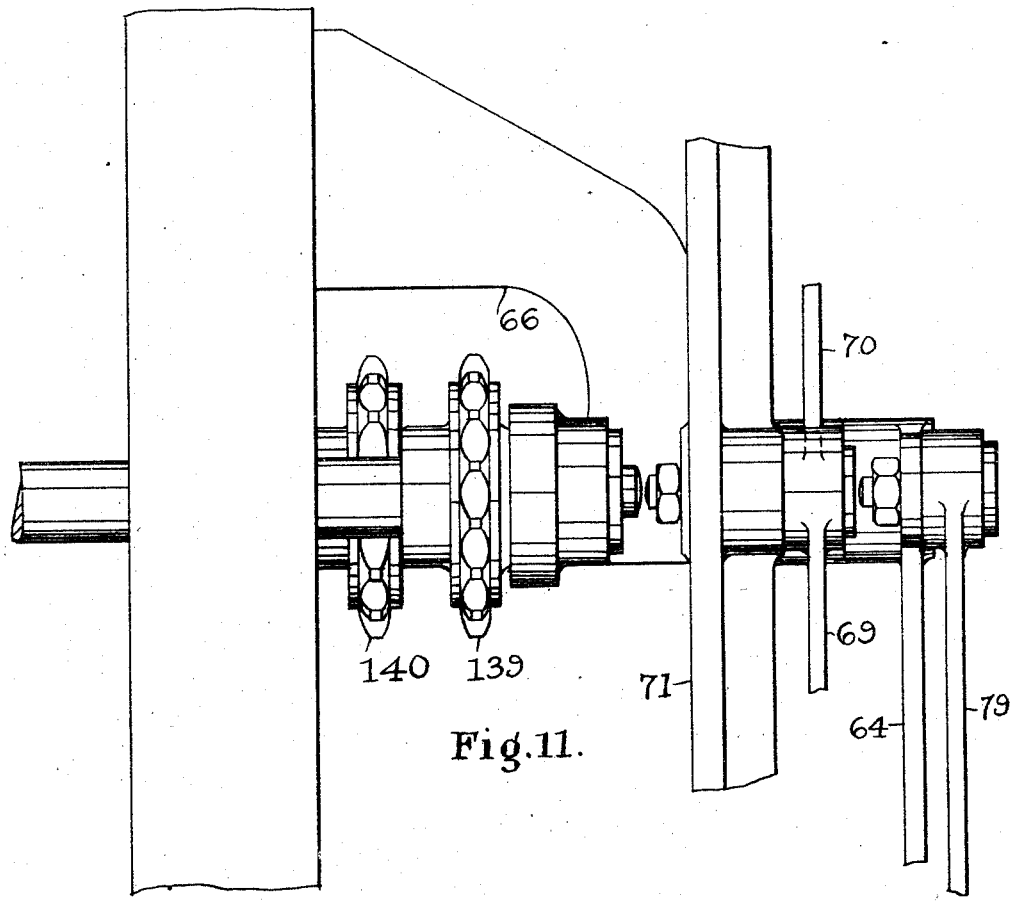
Figure 12:
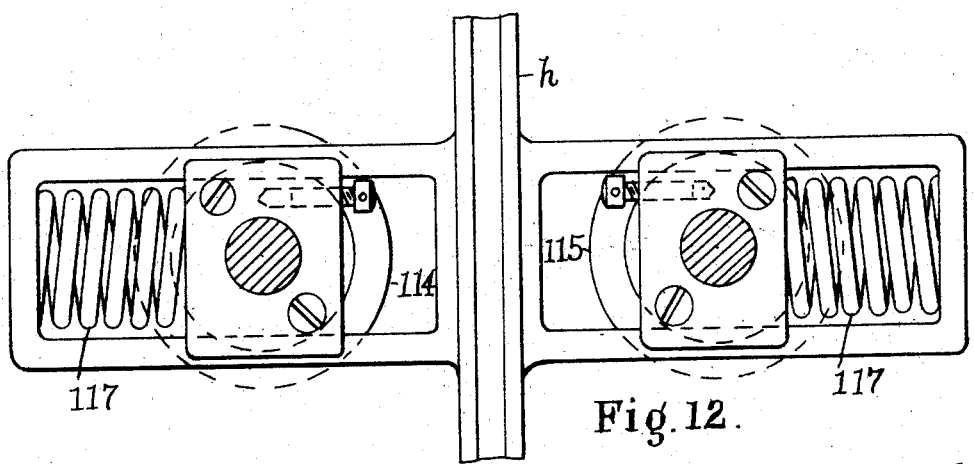
Figure 13:
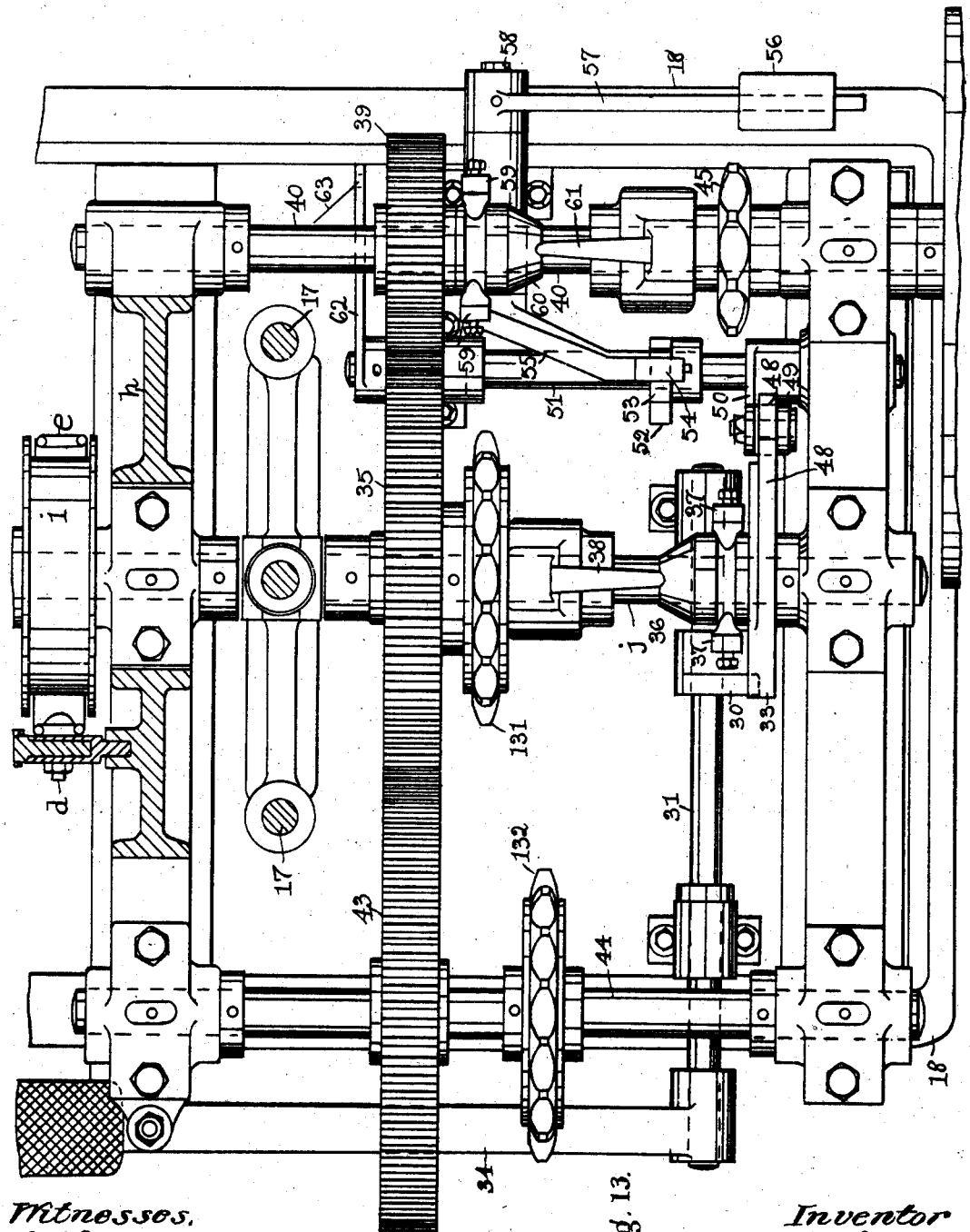
Figure 14:
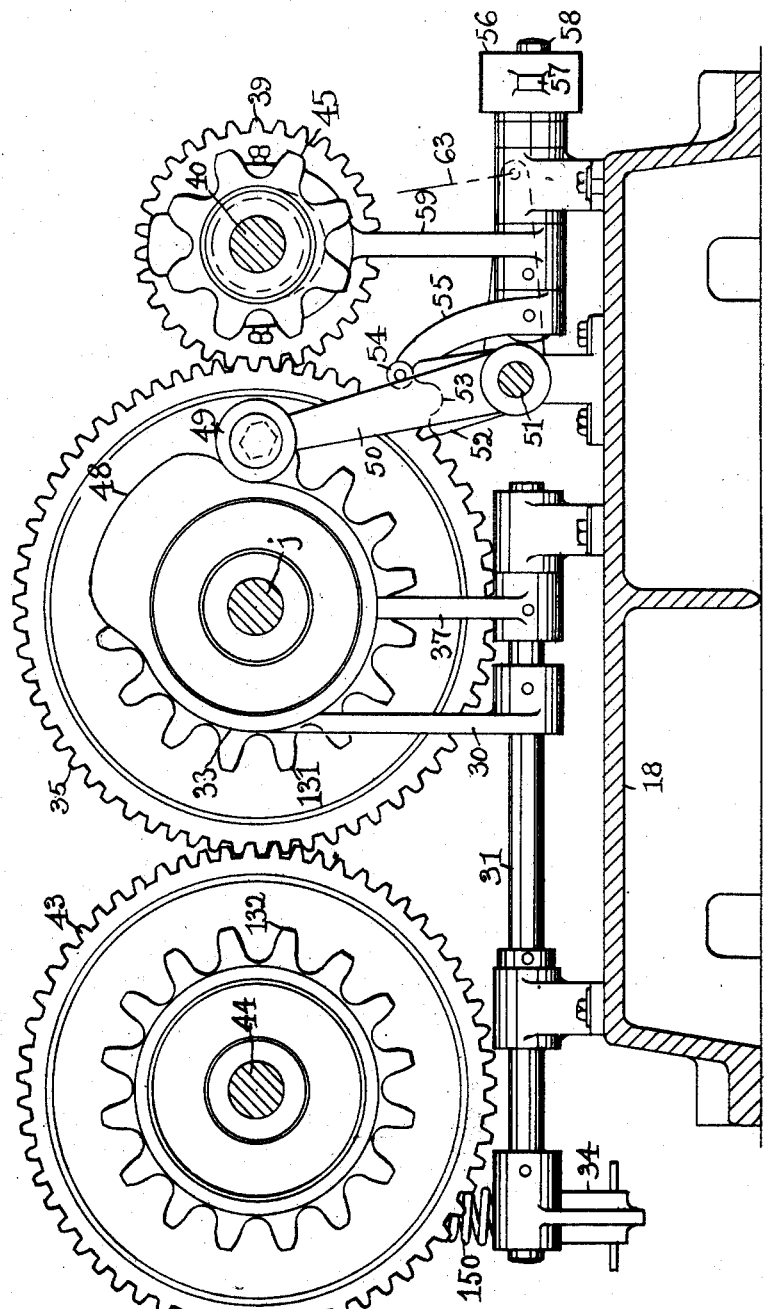

Figure 1 is a rear elevation of a putting-out machine embodying this invention. Figs. 2 and 3, opposite side elevations of the machine shown in Fig. 1. Fig. 4, a vertical section on the line 4—4, Fig. 1, looking toward the right. Figs. 5, 6, 7 and 8, enlarged details of the main and supplemental tables. Figs. 9, 10, 11 and 12, enlarged details to be referred to. Figs. 13, 14, 15 and 16, enlarged details of the driving or operating mechanism to be referred to.

Referring to the drawings, $a$, $b$, represent a pair of working tools or bladed rolls of usual construction and located on opposite sides of the path of movement of a vertically reciprocating substantially flat table or work support $c$, attached at its sides as by bolts $d$, to link chains $e$, passed about sprocket wheels $f$, on a shaft $g$, supported in bearings in the upper part of upright side frames $h$, and about wheels $i$, on a shaft $j$, journaled in the lower part of said side frames.

The parts thus far described may be such as now commonly found in single table putting-out machines, which in use requires two reciprocations of the table $c$ in order to put-out the entire surface of the hide or skin, and which also requires two operators, one at the front and the other at the back of the machine.

The present invention has for one of its objects to provide a single table machine with which the entire surface of the hide or skin may be put-out or otherwise treated in a superior manner, without the use of additional working tools or bladed rolls, and with a single reciprocation of the table or work support. For this purpose, I employ an auxiliary work-support, preferably a rubber covered roll 10, which is normally out of the path of movement of the table $c$, but which is adapted to be brought substantially into said path and in proximity to the working tools or bladed rolls $a$, $b$, so that the back bone or other portion of the hide or skin resting on the roll 10, which may be termed a bed roll for convenience, may be put-out or treated by the working tools or rolls $a$, $b$, prior to the treatment of the sides of the hide or skin by the same rolls. In the present instance, the bed roll 10 is journaled in suitable boxes (not shown) but which slide in guideways 12 in the upright sides $h$ of the framework. The guideways 12 comprise a vertical upper portion 13 substantially in the path of movement of the table and an inclined lower portion which extends away from said path, so that when the bed roll boxes are at the lower end of the guideways 12, the bed roll 10 is removed from the path of the table and the latter is free to be moved without contacting with the bed roll (see Fig. 4). The upper ends of the guideways 12 terminate in proximity to the working rolls $a$, $b$, so that when the bed roll 10 is moved to the end of its upward movement, the portion of the hide or skin resting thereon will be engaged by the working rolls and be effectively put-out or otherwise treated, as will be described.

The bed roll 10 is moved bodily by mechanism, and in the present instance, I have shown one construction of mechanism for accomplishing this result. The mechanism referred to consists of two cams 15 (see Figs. 1 and 3), which may be designated cross head cams and which are joined by links 16, to the journals of the bed roll 10, the said cams being bodily movable on upright guide rods 17 secured at their end to the base 18 of the framework. The cams 15 are provided with slots 19 through which extend the crank pins 20, 21, of cranks or arms 22, 23, on the shaft $j$, said slots having curved upper portions 24, whose curvature is such as to permit the bed roll 10 to remain at the end of its upward movement for a sufficient period of time to enable the portion of the hide or skin thereon to be worked out by the bladed rolls $a$, $b$. This position of the bed roll may be designated its operative or stationary position with relation to the bladed cylinders, although it is capable of being rotated while in this position. The rotation of the bed roll may be effected by means of a link or rod 26 pivotally connected at its lower end to the pin 20 of the crank arm 22 and having at its upper end a rack bar 27 (see Fig. 3), which is kept in mesh with a gear 28 on the bed roll 10, by a guide 29 loosely mounted on a journal of said bed roll. By reference to Fig. 3, it will be seen that rotation of the crank shaft produces reciprocation of the rack bar 26, which effects oscillation of the bed roll 10, with the result that the portion of the hide or skin resting on the bed roll is effectively treated by both rolls, for it is first moved away from the operator and then moved back toward him, thereby insuring effective putting-out of the back-bone portion of the hide or skin for a substantial width, as for instance three inches on each side of the back bone. Any desired pressure on the work while on the bed roll, entirely independent of that on the work while on the table $c$ may be obtained;—(1st) by the density of the rubber cover of the bed roll; (2nd) by varying the length of the connecting rods 16, so that the bed roll may be brought nearer to or farther from the work rolls $a$, $b$, and (3rd), by making the connecting rods 16 in two parts with a spring between and connecting said parts in a manner well understood. There are very practical advantages in working-out the back-bone in this manner over the methods employed in machines as now commonly constructed and known to me. For instance, the hide or skin is tightly held by the work rolls $a$, $b$, on both sides of the back bone and very close to it, which insures the back bone both through the neck and the balance of the skin being kept in a straight line from nose to tail. The two work rolls or bladed cylinders working in opposite directions draw the skin out in both directions from the back bone at the same time, with the result that this rough portion of the skin is worked out in a superior manner. After the back bone portion of the hide or skin has been worked out, as described, the bed roll is lowered into its normal or inoperative position shown in Figs. 3 and 4, by the continued revolution of the shaft $j$, and when the bed roll reaches its lowered position, it is automatically held at rest by a dog 30 (see Figs. 13 to 16) on a rock shaft 31 dropping into a recess or notch 32 in the face of a cam disk 33 fast on the shaft $j$. The rock-shaft 31 is provided as shown with a foot treadle 34 by depressing which the dog 30 is withdrawn from the notch in the cam disk 33, and the latter and its shaft $j$ are permitted to be rotated by a gear 35 normally loose thereon, but adapted to be rendered fast on the said shaft by a clutch of any suitable or usual construction, the movable member of which is herein shown as a cone 36, which is moved by a forked arm or crank 37 fast on the rock-shaft 31 and which coöperates with a finger 38 to render the gear 35 fast on said shaft. The gear 35 meshes with a gear or pinion 39 on a main or driving shaft 40 provided with fast and loose pulleys 41, 42 (see Fig. 1), and also meshes with a gear 43 on a counter shaft 44 (see Fig. 13). At or about the time the bed roll 10 starts to move downward, the table $c$ is automatically moved upward, which is accomplished as herein shown by rendering a sprocket wheel 45 (see Figs. 1, 13 and 16) fast on the main shaft 40. The sprocket wheel 45 is connected by a link chain 46 with a large sprocket wheel 47 fast on the shaft $g$ (see Fig. 1), which shaft may be termed the table lifting shaft.

The sprocket wheel 45 may be designated the table lifting sprocket wheel, and is rendered fast on the main shaft 40 by a clutch of any suitable construction, which is controlled by a projection 48 on the periphery of the cam 33 (see Fig. 14), which is arranged so that at or about the time the shaft $j$, which may be designated the cam shaft, has made substantially a half revolution, the cam projection 48 engages a roller 49 on a crank or arm 50 on a rock-shaft 51, (see Figs. 13 and 14), which has a second arm or casting 52 having a recess 53 into which a roller 54 on a crank 55 is adapted to be lowered by a weight 56 on an arm 57 attached to a rock-shaft 58 to which the crank 55 is secured. The rock-shaft 58 has fast to it a forked arm 59, which engages the sliding member or cone 60 of the clutch controlling the sprocket wheel 45, said cone coöperating with a finger 61, which is adapted to render the sprocket wheel 45 fast on the shaft 40 in a manner well understood. In this manner, the table lifting shaft g is rotated and the table c is elevated, together with a supplemental table as will be described, until the main table c has reached the limit of its upward movement, whereupon the clutch cone 60 is moved in the reverse direction, by means of the recessed arm 52 on the rockshaft 51, which latter is provided with a crank or arm 62, to which is attached one end of a chain or other flexible connection 63 (see Fig. 13), which has its other end connected with a crank 64 on a rock-shaft 65 (see Figs. 2, 9, 10 and 11). The rock shaft 65 is mounted in a bracket 66 attached to a side frame of the machine (see Figs. 1 and 11) and has fast on it two arms 67, 68, which are connected by links 69, 70, with the swing arms 71, 72 carrying the boxes 73, 74 for the bladed cylinders or rolls a, b, said boxes being movable in slots 75 in said swing arms and acted upon by springs 76 to cause the said rolls to engage the work with a yielding pressure. The boxes 73, 74 are provided with suitable stops, shown as screws 77 (see Fig. 3) to limit their movement toward each other and to properly position the bladed rolls with relation to the path of movement of the table. The rock-shaft 65 has attached to it a second crank 78, which is joined by a link 79 (see Fig. 2), to a lever 80 joined by a link 81 to a lever 82 mounted on the pivot 83 of the swing arms 71 and having an arm 84 (see Fig. 4), which is projected into the path of movement of the table to be engaged by a cam or projection 85 on the table at the side thereof, so that when the main table c has reached the limit of its upward movement, the working rolls a, b, may be automatically moved away from each other to afford ample room for the table to descend to its lowered or starting position. It will be understood, that the swing arms 71, 72 at each side of the machine are connected as described to a rock-shaft 65 at each side of the machine (see Figs. 1, 2 and 3), so that movement of the crank 64 effects movement of the swing arms at both sides of the machine. By reference to Figs. 2 and 4, it will be seen that when the projection 85 on the table c strikes the arm 84, the lever 82 is moved downward and the parts connecting it with the rock-shaft 65 are moved in the directions indicated by the arrows thereon and the crank 64 is moved in the direction indicated by the arrow 88, Fig. 2, with the result that the link chain 63 is drawn up and lifts the arm 62 so as to rock the shaft 51 and through the arm 52 raise the crank 55 and rock the shaft 58, so as to throw out the clutch and render the lifting sprocket 45 loose on its shaft 40. The working rolls a, b, are held in their open or spread-apart position as long as the crank 55 is maintained in its raised position by the arm 52 on the rock shaft 51, which is until the cam 48 on the disk 33 operates the crank 50 to rock the shaft 51 so as to bring the recess 53 in said crank below the crank 55 unless in the meantime, the work rolls a, b, are closed by the operator, as will be described.

The main table c may and preferably will have coöperating with it a supplemental or false table, which may be made as herein shown, (see Figs. 5 to 8), and consists of two sides 90, 91, connected together at their ends by irons or yoke-shaped pieces 92, which travel in guideways or grooves 93 in the upright sides h of the framework, and which are provided on their inner sides with grooves or guideways 94 for the main table c, which latter is capable of traveling in the guideways 94 in the yokes or irons 92 of the supplemental table, when the latter is held stationary as will be described. Provision is made for detachably connecting the main and supplemental tables, so that under conditions as will be described, both tables may move as one, and under other conditions, either may move independently of the other. In the present instance, I have shown one construction for accomplishing this result, which consists of sliding pins 95 carried by the yokes or iron pieces 92 of the supplemental table and rounded at their opposite ends, each pin being provided with a collar 96 against which presses a helical spring 97 encircling the pin 95 between the collar 96 and the end wall of the guideway 93 in which the supplemental table travels. The spring 97 normally forces the inner end of the pin 95 into a socket or recess 98 in the side edge of the main table and couples the two tables together so as to move as one piece, when the main table is in its lowered position. On the upward movement of the main table, the supplemental table rises with it, until the latter is brought into proximity to the bladed rolls a, b, at which time the lugs 99 on the supplemental table engage stops, represented in Fig. 5 as screws 100 carried by brackets 101 attached to the side frames of the machine. The stops 100 are arranged so as to engage the lugs 99 at or about the time the pins 95 are brought opposite recesses or sockets 102 in the side frames of the machine, into which their outer ends are forced by inclined walls 104 of the sockets 98 in the main table as the latter continues its upward movement, while their inner ends are forced out of their sockets 95 by the inclined walls of the latter and retained in their disengaged position by the straight side edge of the main table, which continues its upward movement, passing through the supplemental table and between the working rolls, until its projection 85 engages the arm 84 of the lever 82 to throw out the clutch controlling the lifting sprocket 45 and separate the work rolls $a$, $b$, as above described. The supplemental table remains locked to the main frame, until the main table has been lifted above the supplemental table, whereupon the springs 97 disengage their pins 95 from the sockets 102 in the side frames and leave the supplemental table free to drop by gravity to its lowered or starting position represented in Fig. 5, with its bottom resting on suitable stops 105 attached to the side frames. A second recess 106 is provided in the side frames $h$ opposite the lower position of the supplemental table, into which the locking pins 95 can be forced by the main table as the latter descends, and when the main table comes to rest in its lowered or starting position, the springs 97 force the inner ends of the pins into the recesses 98 in the sides of the main table to again lock the supplemental table to the main table. The supplemental table is used for two distinct purposes, both of great practical advantage. In the first place, it acts as a guard to prevent somewhat frequent accidents of the operator having his hand carried between the bladed rolls by the main table, which usually results in the loss of a hand or arm.

It will be noticed by inspection of Figs. 4 and 6, that the supplemental table is normally projected some distance above the main table, consequently, if the operator's hand is on the top of the supplemental table, he will receive timely warning, so that he can remove the same or stop the work rolls, and also from the construction, it will be seen that the operator cannot be injured, as by pressing upon the top of the supplemental table, he is able to stop its upward progress or to push it back to its lower position from any point in its upward travel before the locking pins enter the sockets 102, regardless of the upward travel of the main table. Another object of the supplemental table, is to prevent the wet skin touching the sides of the main table before it is placed there by the work rolls.

In single table machines as now commonly constructed, two operators are required to hold out the skin as well as possible, until the rolls are about to work on the same, but this cannot be accomplished as well on small skins or the necks and edges of large skins by hand as with the false table, as naturally the operator cannot allow his hands to approach as near the work rolls as does the supplemental table. It will be noted, that by the position of the supplemental table, when in its extreme upward position, the skin will come in contact with the rolls or cylinders $a$, $b$ to a slight extent between the top of the supplemental and the main tables, which will result in the skin being placed on the main table free from all wrinkles, so that it will be worked out smoothly and to its fullest extent on the main table by the work rolls. Furthermore, the danger of tearing the skins is avoided, and much lighter and weaker stock, such as skivers, can be worked on the present machine than on the single table machines now commonly used.

Provision is made for absorbing the shock of the main table as it reaches the end of its downward movement, and for this purpose, a stud 110 is attached to each of the lifting chains, so that as the main table approaches the end of its downward movement, the said studs come in contact with levers 112 (see Fig. 4) and lift the same against the action of springs 113, the extension of which absorbs the weight of the falling table, so that the same comes to rest without shock. Provision is also made for automatically removing the treated hide or skin as the main table descends. For this purpose, I employ revolving brushes 114, 115 located on opposite sides of the path of movement of the table. The brushes 114, 115 are normally held away from the path of the table by a rotary cam 116 fast on the shaft 65 (see Figs. 1 and 10) and shaped so as to permit the said brushes to be moved by springs 117 (see Figs. 4 and 12) acting against the boxes in which said brushes are journaled, toward the path of the table to such extent as to engage the treated hide or skin on the descent of the table. The cam 116 rotates with the shaft 65 and engages rollers 216 on the shafts of the brushes 114, 115, and is so shaped and arranged on the shaft 65 that as the latter is rotated to open the work rolls $a$, $b$, the said cam permits the brushes to be moved by their springs 117 toward the path of movement of the table and into position to engage the hide or skin on the opposite sides of the said table when the latter is moving downward. The brushes 114, 115 are revolved in a direction opposite to that of the falling table and separate the sides of the hide or skin from the sides of the main table. The portion of the hide or skin removed from the rear side of the main table is carried by the brush 115 onto an endless belt composed of strings 118, which run between the bristles of the brush 115 at suitable intervals and about a suitable roll 119 supported by cranks or arms 120, which have their outer ends supported by links 121 (see Fig. 4). The brush 114 at the front of the table has coöperating with it an inclined stationary plate or table 122 (see Fig. 4), upon which the hide or skin is delivered by the said brush. After the main table has passed by the brushes 114, 115 on its descent, the said brushes are opened by the cam 116 which is rotated back into its starting or normal position as will be described, so as to separate the brushes, and it will be noticed that the roll 119 is moved upward so as to incline the string belt 118 sufficiently to enable the hide or skin to clear the brush 115, that is, the opening movement of the brush 115 lifts the hide or skin off from the same and leaves the brush 114 alone in contact with the hide or skin, with the result, that the hide or skin is carried out of the machine before the main table again rises. Provision is also made for reversing the table and opening and closing the work and brush rolls at any moment, and for this purpose the levers 80 are connected by a rod 130, which forms a hand lever, by means of which the operator can manipulate the machine to avoid tearing of poor skins or to work small skins, without the necessity of the main table moving upward its complete travel. The rotation of the cam 116 to open the brushes and close the working rolls is effected by the operator manipulating the handle 130, so as to move the levers 80 and the parts connected with them in the direction opposite to that indicated by the arrows thereon in Fig. 2.

In practice, the operator, after placing a skin on the bed roll, only keeps hold of it until the table has risen and he has drawn the skin forward so that it is in proper position on the supplemental table. He then reaches up and removes the skin, which has been previously put-out, from the inclined table 122, places the same on a horse or other support (not shown) and picks up a fresh skin, ready to throw it over the bed roll as soon as the table drops to rest, and as the machine is started by the foot treadle, it is not necessary for him to remove his hands from the skin, until he is able to do so finally, consequently the machine can be operated very rapidly.

The work rolls $a$, $b$ may be driven from the shafts $j$, 44, by sprocket wheels 131, 132, link chains 133, 134, and sprocket wheels 135, 136, and the brush rolls may be driven from the work rolls by link chains (not shown), but which are passed about sprocket wheels 137, 138, on the work rolls (see Fig. 1) and about sprocket wheels 139, 140 on the brush rolls 114, 115.

I have herein shown one construction of machine embodying this invention, but I do not desire to limit the same to the particular construction herein shown.

Figure 15:
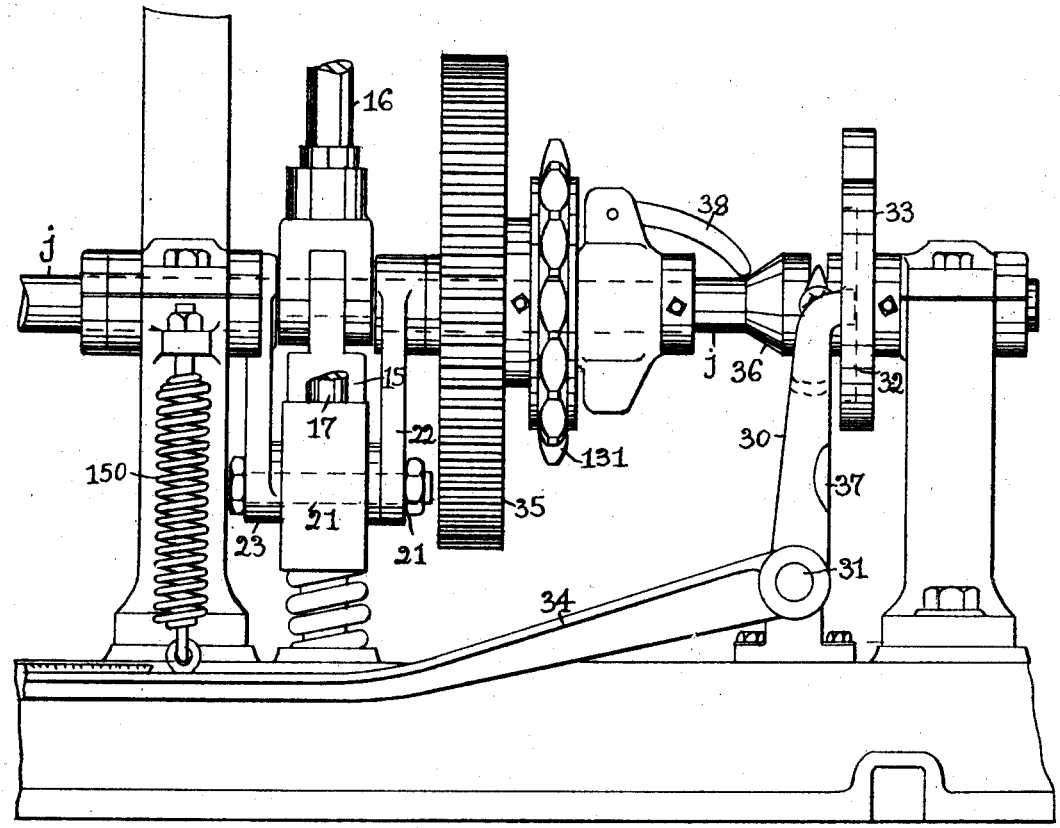
Figure 16:
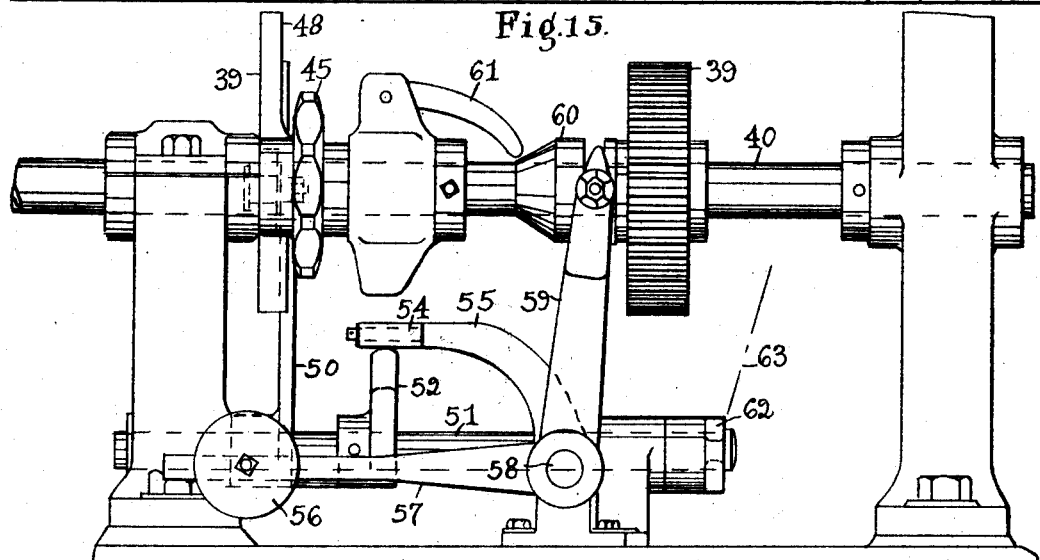

The dog 30 is held in engagement with its notch 32 in the cam disk 33 by the spring 150 (see Fig. 15).

Claims.

1. In a machine of the character described, in combination, a reciprocating work support or table, working rolls located on opposite sides of the path of movement of said table, a bed roll movable toward and from said working rolls and into and out of the path of movement of said table, power-operated means for moving said bed roll toward the said work rolls while the said table is in its lower position, power-operated means for rotating said bed roll in its operative position, power-operated means for moving said table when the said bed roll is out of the path of movement of said table, power-operated means for separating said work rolls to permit of the descent of said table, rotary brushes located on opposite sides of said table and coöperating therewith on its descent, and means governing the position of said brushes with relation to said table, substantially as described.

2. In a machine of the character described, in combination, a reciprocating work-support or table, working rolls located on opposite sides of the path of movement of said table, rotatable devices located on opposite sides of the path of movement of said table, means to maintain said devices inactive upon the hide or skin while the said table is moving in one direction, and to permit them to engage the hide or skin and detach it from the sides of the table when the latter is moved in the opposite direction, substantially as described.

3. In a machine of the character described, in combination, a work-support movable in a substantially vertical plane, a rotary brush located on one side of the path of movement of said work-support, an endless belt passed about said brush, a roll about which the endless belt is passed, said roll being movable vertically to incline the endless belt and lift the work from the said brush, and a rotary brush located on the opposite side of the path of movement of said table and coöperating with the work to remove it from the endless belt, substantially as described.

4. In a machine of the character described, in combination, a vertically movable work-support, working rolls located on opposite sides of the path of movement of said work-support, a bed roll movable toward and from said working rolls and into and out of the path of movement of the work-support, and means to rotate said bed roll when in proximity to the working rolls, substantially as described.

5. In a machine of the character described, in combination, a vertically movable table, a supplemental table coöperating therewith and movable independently thereof, and means to detachably lock the said tables together, substantially as described.

6. In a machine of the character described, in combination, a vertically reciprocating work support, working tools located on opposite sides of the path of movement of said work-support, an auxiliary work support reciprocating in a plane inclined with relation to the path of movement of said work-support and toward and from said working tools, and means for moving the said work-supports, substantially as described.

7. In a machine of the character described, in combination, a main work-support reciprocating in a substantially vertical plane, working tools located on opposite sides of the path of movement of said work-support, an auxiliary work-support movable toward and from said tools and into and out of the path of movement of said main work-support, means for moving said work-supports, and means for moving said working tools away from the path of movement of said main work support, substantially as described.

8. In a machine of the character described, in combination, a main work-support reciprocating in a substantially vertical plane, an auxiliary work-support movable in a path inclined with relation to the path of the main work-support, working tools located on opposite sides of the path of movement of the main work-supports and coöperating in succession with the work while on the auxiliary work-support and said main work-support, and means for moving said work-supports, substantially as described.

9. In a machine of the character described, in combination, a main work-support reciprocating in a substantially vertical path, working tools located on opposite sides of the path of movement of said main work-support, an auxiliary work-support reciprocating toward and from said working tools, and means for rotating the auxiliary support when in proximity to said working tools, substantially as described.

10. In a machine of the character described, in combination, a main table or work-support reciprocating in a substantially vertical plane, working rolls located on opposite sides of the path of movement of said table or work-support, means for separating said rolls on the downward movement of said main table, an auxiliary reciprocating work-support movable toward said working rolls when the main work-support is in its lower position, and means for moving said work-supports, substantially as described.

11. In a machine of the character described, in combination, a substantially flat main table provided in its side edges with recesses having inclined walls, a supplemental table having guideways in which said main table moves, locking pins carried by said supplemental table, and springs coöperating with said pins to force them into the recesses in said main table, substantially as described.

12. In a machine of the character described, in combination, a vertically movable main table, a supplemental table having guideways in which said main table moves, and spring-actuated devices carried by said supplemental table and coöperating with said main table to lock the said tables together, substantially as described.

13. In a machine of the character described, in combination, a vertically movable main table, a supplemental table having guideways in which said main table moves, upright frames having guide ways in which said supplemental table moves, locking pins carried by the supplemental table for coupling together the main and supplemental tables, springs to act on said locking pins, said main table and said upright frames having recesses for the reception of said locking pins, substantially as described.

14. In a machine of the character described, in combination, a vertically reciprocating table, working rolls located on opposite sides of the path of movement of said table and normally in the path of the same, rotatable brushes located on opposite sides of the path of movement of said table and normally out of the path of the same, and means for effecting movement of said rolls and brushes in opposite directions, substantially as described.

15. In a machine of the character described, in combination, a reciprocating main work-support, a reciprocating auxiliary work-support, working tools located on opposite sides of the path of movement of the said main work-support and coöperating with both of said work-supports, means to move said supports, and means for moving said working tools away from the path of movement of the main work-support, substantially as described.

16. In a machine of the character described, in combination, a reciprocating table or work-support, working tools coöperating therewith, a hoisting shaft with which said table is connected, a main shaft, a cam shaft, means connecting said hoisting shaft with said main shaft, a clutch to render said means fast to the main shaft, a rock-shaft provided with a crank or arm to operate said clutch, a second rock-shaft controlling the action of the clutch operating rock-shaft, and a cam on the cam shaft controlling the action of the second-mentioned rock-shaft, substantially as described.

17. In a machine of the character described, in combination, a vertically movable main table, a supplemental table coöperating therewith and normally projecting above the main table and through which the main table travels, and working rolls located on opposite sides of the path of movement of the main table and acting on the work on the supplemental table prior to the said work being engaged by the main table, substantially as described.

18. In a machine of the character described, in combination, a vertically movable work-support, working tools located on opposite sides of the path of movement of said work-support, an auxiliary work-support reciprocating in a plane inclined with relation to the path of movement of said work-support and toward and from said working tools, and means for moving said work-supports, substantially as described.

19. In a machine of the character described, in combination, a movable main work-support, working rolls located on opposite sides of the path of movement of said main work-support to engage the work on the opposite sides of the said main work-support, an auxiliary work-support working in coöperation with the main work-support and movable toward and from the working rolls so as to present the work on the auxiliary work-support to the working rolls to be simultaneously acted upon by the rolls on opposite sides of the path of movement of the main support, and means for moving said work-supports, substantially as described.

In testimony whereof, I have signed my name to this specification in the presence of two subscribing witnesses.

FRANKLIN JAY PERKINS.

Witnesses:
HENRY ALLEN HOLDER,
JEAN GRUND.